USOO7290250B2

(12) United States Patent
Shinn et al.

(10) Patent No.: US 7,290,250 B2
(45) Date of Patent: Oct. 30, 2007

(54) SYSTEM AND METHOD FOR DETERMINING WHEN AN EJB COMPILER NEEDS TO BE EXECUTED

(75) Inventors: Matthew Shinn, San Francisco, CA (US); Seth White, San Francisco, CA (US); Rob Woollen, San Francisco, CA (US)

(73) Assignee: BEA Systems, Inc., San Jose, CA (US)

( * ) Notice: Subject to any disclaimer, the term of this patent is extended or adjusted under 35 U.S.C. 154(b) by 0 days.

(21) Appl. No.: 10/785,846

(22) Filed: Feb. 24, 2004

(65) Prior Publication Data

US 2004/0172625 A1 Sep. 2, 2004

Related U.S. Application Data

(60) Provisional application No. 60/450,645, filed on Feb. 28, 2003.

(51) Int. Cl.
*G06F 9/45* (2006.01)
*G06F 9/44* (2006.01)

(52) U.S. Cl. .................................... 717/140; 717/130

(58) Field of Classification Search ................ 717/109, 717/108, 130–140, 116
See application file for complete search history.

(56) References Cited

U.S. PATENT DOCUMENTS 6,557,100 B1 * 4/2003 Knutson ..................... 713/100

2004/0093588 A1* 5/2004 Gschwind et al. .......... 717/130

OTHER PUBLICATIONS

'Language-Specific Make Technology for the Java Programming Language', by Mikhail Dmitriev, OOPSLA'02, Nov. 4-8, 2002.*
'Enterprise JavaBeans' from Webopedia, http://web.archive.org/web/20020815195433/http://www.webopedia.com/TEM/E/Enterprise_JavaBeans.*
'Smarter Recompilation', by Robert W. Schwanke and Gail E. Kaiser, 1988 ACM 0164-0925/88/1000-0627.*
'Enterprise JavaBeans' from Webopedia, http://www.webopedia.com/TERM/E/Enterprise_JavaBeans.html.*
"Using WebLogic Enterprise JavaBeans", pp. 1-30, http://web.archive.org/web/20021015004909/http://www.weblogic.com/docs/classdocs/API_ejb.html.*
"Using WebLogic's distributed server-side Beans", pp. 1-11, http://web.archive.org/web/20010520113418/http://www.inf.fu-berlin.de/lehre/WS00/SWT/BEA/documentation/docs51/classdocs/API_bean.html#overview.*

* cited by examiner

*Primary Examiner*—Wei Zhen
*Assistant Examiner*—Chih-Ching Chow
(74) *Attorney, Agent, or Firm*—Fliesler Meyer LLP

(57) ABSTRACT

A system for determining when an EJB compiler needs to be executed, comprising: a server, including an EJB or plurality of EJBs and an EJB compiler operating thereon; and, a logic that determines a first snapshot of the EJB at a particular moment in time or for a particular server version, and a second snapshot of said EJB at a later moment in time or a subsequent server version, and compares the first and second snapshots to determine whether the EJB should be recompiled.

20 Claims, 1 Drawing Sheet

SYSTEM AND METHOD FOR DETERMINING WHEN AN EJB COMPILER NEEDS TO BE EXECUTED

CLAIM OF PRIORITY

This application claims priority to U.S. Provisional Patent Application 60/450,645, filed Feb. 28, 2003, and incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention relates generally to application servers and software development systems, and particularly to a system and method for determining when an EJB compiler needs to be executed.

BACKGROUND

In a typical application server, for example the WebLogic Server product from BEA systems, Inc., for an EJB to be deployed in the server, the EJB Compiler must be invoked on the ejb-jar file containing the EJB prior to deployment. For each EJB in the ejb-jar file, the EJB Compiler is responsible for validating the EJB, generating wrapper classes for the EJB, compiling the generated wrapper classes and invoking the RMI Compiler when necessary. This can be a time consuming process, on the order of several seconds per EJB. For an ejb-jar file with a large number of EJBs, the combined time can be significant.

To make matters worse, the EJB Compiler usually needs to be run each time the ejb-jar file is updated. An ejb-jar file is typically updated several times as it is developed. Compounding the issue further is the fact that the EJB Compiler is often invoked via a script, which doesn't typically have logic to determine whether the EJB Compiler actually needs to be invoked or not. This means the script invokes the EJB Compiler even when it doesn't need to, wasting valuable time.

The EJB Compiler also needs to be run after the server is upgraded, since the classes generated by the EJB Compiler may be incompatible with the new server code. If, after upgrading to a new server version, the user forgets to run the EJB Compiler before deploying the EJB, unexpected errors can result.

Another problem is that users may forget to run the EJB Compiler on an EJB after updating it. This can also lead to unexpected errors when the EJB is deployed since the classes generated by the EJB Compiler may no longer be compatible with the EJB.

SUMMARY

The invention provides a system and method for determining when an EJB compiler needs to be executed. To determine if an EJB needs to be recompiled or not, we need to know the state of the EJB and the server version of when it was last compiled. Once we have this information, we can compare it to the current state of the EJB and current server version to determine whether we need to rerun the EJB compiler or not. In accordance with one embodiment, the invention comprises the following steps: obtaining the current server version and recording it in a file; for each dependent EJB class, computing a unique hash based on the public method signatures and public field declarations for the class; recording the fully qualified class name along with its computed hash to a file; for each deployment descriptor for the EJB, computing a unique hash based on the bytes of the file; recording the deployment descriptor name along with its computed hash to the file containing the class names and hashes; and, storing the file containing the hashes in the compiled ejb-jar file.

DETAILED DESCRIPTION

Figure 1:
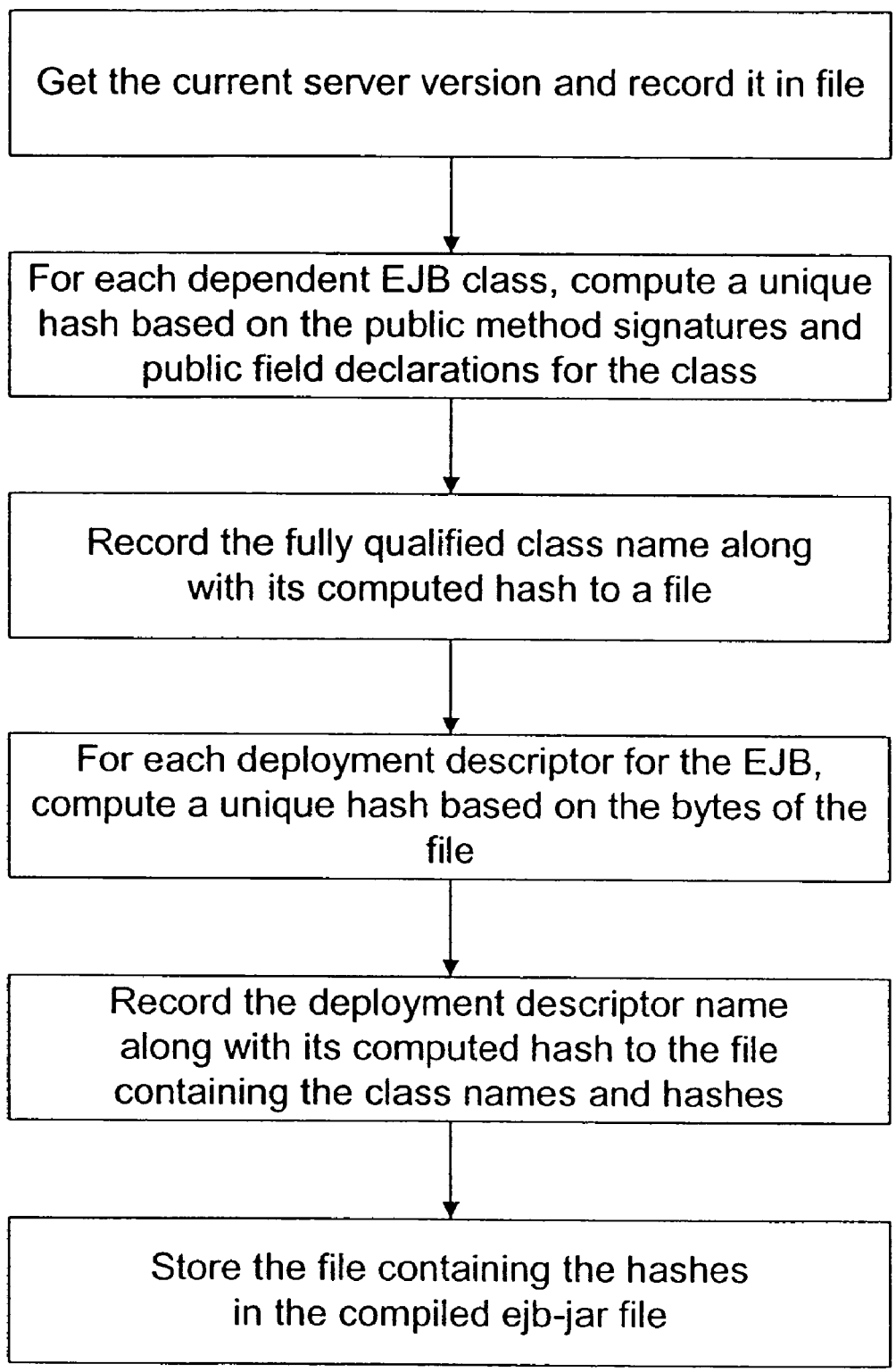
FIG. 1 shows a flowchart illustrating the algorithm or process that is run each time the EJB Compiler is invoked, in accordance with an embodiment of the invention.

The invention provides a system and method for determining when an EJB compiler needs to be executed. To determine if an EJB needs to be recompiled or not, the system needs to know the state of the EJB and the server version of when it was last compiled. Once this information is obtained, it can be compared to the current state of the EJB and current server version to determine whether to rerun the EJB compiler or not. Since only certain changes to an EJB require the EJB Compiler to be run, the comparison can be limited to attributes that would require the EJB Compiler to rerun. In accordance with one embodiment, the following changes require an EJB to be recompiled:

Any change to a deployment descriptor for an EJB.

Any change to a public method signature (including addition or removal of a public method) of a dependent EJB class (i.e. an EJB implementation class, interface, or primary key class).

Any change to a public field declaration (including addition or removal of a public field) of a dependent EJB class.

Having the ability to determine when the EJB Compiler must be rerun allows the system to automatically rerun the compiler, when necessary, inside of the server. For instance, if the user upgrades the server and forgets to rerun the EJB Compiler, the system can detect that the EJB Compiler needs to be rerun and automatically do this for the user when the EJB is deployed to the server. Similarly, the system can also automatically run the EJB Compiler if the user forgets to rerun the compiler after updating her EJB. This is very helpful since it avoids situations where unexpected errors can occur during deployment due to incompatibilities with the classes generated by the EJB Compiler.

EJB Compiler Algorithm

FIG. 1 shows a flowchart illustrating the algorithm or process that is used by the system, in accordance with an embodiment of the invention. The algorithm is run each time the EJB Compiler is invoked. It provides a relative snapshot of the EJB and server version at the time the EJB is compiled. As shown in FIG. 1, the algorithm or process comprises the following steps:

1. Get the current server version and record it in a file.
2. For each dependent EJB class, compute a unique hash based on the public method signatures and public field declarations for the class.

3. Record the fully qualified class name along with its computed hash to a file.
4. For each deployment descriptor for the EJB, compute a unique hash based on the bytes of the file.
5. Record the deployment descriptor name along with its computed hash to the file containing the class names and hashes.
6. Store the file containing the hashes in the compiled ejb-jar file.

With this snapshot, the system can determine, at a later time, whether it needs to rerun the EJB Compiler for a given EJB. If the current snapshot of the EJB is equal to the snapshot of the EJB when it was last compiled, then we don't need to recompile.

The present invention may be conveniently implemented using a conventional general purpose or a specialized digital computer or microprocessor programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. Particularly, it will be evident that while the examples described herein illustrate how the invention may be used in a WebLogic environment, other application servers, and computing environments may use and benefit from the invention.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for determining when an EJB compiler needs to be executed, comprising:
   a server, having a server version information associated therewith and executing a plurality of compiled EJB classes stored thereon;
   an ejb-jar file for storing the plurality of compiled EJB classes, together with, for each EJB class therein, a first snapshot of deployment related version information for that EJB class, wherein each snapshot defines a deployment descriptor for the EJB class and the versions of both the EJB classes, and of the server, at the time that particular EJB class was compiled;
   an EJB compiler that generates wrapper classes for each EJB class as necessary; and
   a logic that following deployment of one of a new version of a compiled EJB class and a previously compiled EJB class, to a new version of the server, at a later point in time, automatically determines a second snapshot of deployment related version information for the new version of the compiled EJB class and the new version of the server, and compares the first and second snapshots to determine whether the EJB compiler needs to be invoked on the previously compiled and new version of the compiled EJB class and the new version of the server, and if so automatically generates and compiles wrapper classes for the previously compiled and new version of the compiled EJB class, and the new version of the server.

2. The system of claim 1 wherein said logic performs the step, for each EJB class, of:
   obtaining a current server version and storing it to a snapshot file;
   for each dependent EJB class, computing a unique hash based on public method signatures and public field declarations for the EJB class;
   recording a fully qualified class name along with its computed hash to said snapshot file;
   for each deployment descriptor, computing a unique hash;
   recording the deployment descriptor name along with its computed hash to said snapshot file; and,
   associating the snapshot file with the EJB class.

3. The system of claim 2 wherein said for each dependent EJB class computing a unique hash is based on the public method signatures and public field declarations for the class.

4. The system of claim 2 wherein said for each deployment descriptor computing a unique hash is based on the bytes of the deployment descriptor file.

5. The system of claim 2 wherein said associating the snapshot file with the EJB class includes storing the snapshot file in the ejb-jar file.

6. The system of claim 1, wherein the deployment related version information includes one or more deployment descriptor components that are represented as a plurality of hash values, and wherein upon deployment, the deployment descriptor component's hash value are compared between those in the first snapshot and those in the second snapshot, and if either one or both of the hash values has changed, indicating a change in either one or both of the dependent EJB classes and the deployment descriptor, then the EJB compiler is automatically invoked.

7. A method for determining when an EJB compiler needs to be executed, comprising the steps of:
   providing a server, having a server version information associated therewith and executing a plurality of compiled EJB classes stored thereon; providing an ejb-jar file for storing the plurality of compiled EJB classes, together with, for each EJB class therein, a first snapshot of deployment related version information for that EJB class, wherein each snapshot defines a deployment descriptor for the EJB class and the versions of both the EJB classes, and of the server, at the time that particular EJB class was compiled;
   providing an EJB compiler that generates wrapper classes for each EJB class as necessary; and
   automatically determining following deployment of one of a new version of a compiled EJB class and a previously compiled EJB class to a new version of the server, at a later point in time, a second snapshot of deployment related version information for the new version of the compiled EJB class and the new version of the server, and comparing the first and second snapshots to determine whether the EJB compiler needs to be invoked on the previously compiled and new version of the compiled EJB class and the new version of the server, and if so automatically generating and compiling wrapper classes for the previously compiled and new version of the compiled EJB class, and the new version of the server.

8. The method of claim 7 wherein said determining further comprises:
   obtaining a current server version and storing it to a snapshot file;
   for each dependent EJB class, computing a unique hash based on public method signatures and public field declarations for the EJB class;
   recording a fully qualified class name along with its computed hash to said snapshot file; for each deployment descriptor, computing a unique hash;
   recording the deployment descriptor name along with its computed hash to said snapshot file; and,
   associating the snapshot file with the EJB class.

9. The method of claim 8 wherein said for each dependent EJB class computing a unique hash is based on the public method signatures and public field declarations for the class.

10. The method of claim 8 wherein said for each deployment descriptor computing a unique hash is based on the bytes of the deployment descriptor file.

11. The method of claim 8 wherein said associating the snapshot file with the EJB class includes storing the snapshot file in the ejb-jar file.

12. The method of claim 7, wherein the deployment related version information includes one or more deployment descriptor components that are represented as a plurality of hash values, and wherein upon deployment, the deployment descriptor component's hash value are compared between those in the first snapshot and those in the second snapshot, and if either one or both of the hash values has changed, indicating a change in either one or both of the dependent EJB classes and the deployment descriptor, then the EJB compiler is automatically invoked.

13. A computer readable medium including instructions stored thereon which when executed cause the computer to perform the steps of:
   providing a server, having a server version information associated therewith and executing a plurality of compiled EJB classes stored thereon; providing an ejb-jar file for storing the plurality of compiled EJB classes, together with, for each EJB class therein, a first snapshot of deployment related version information for that EJB class, wherein each snapshot defines a deployment descriptor for the EJB class and the versions of both the EJB classes, and of the server, at the time that particular EJB class was compiled;
   providing an EJB compiler that generates wrapper classes for each EJB class as necessary; and
   automatically determining following deployment of one of a new version of a compiled EJB class and a previously compiled EJB class, to a new version of the server, at a later point in time, a second snapshot of deployment related version information for the new version of the compiled EJB class and the new version of the server, and comparing the first and second snapshots to determine whether the EJB compiler needs to be invoked on the previously compiled and new version of the compiled EJB class and the new version of the server, and if so automatically generating and compiling wrapper classes for the previously compiled and new version of the compiled EJB class, and the new version of the server.

14. The computer readable medium of claim 13 wherein said determining further comprises:
   obtaining a current server version and storing it to a snapshot file;
   for each dependent EJB class, computing a unique hash based on public method signatures and public field declarations for the EJB class;
   recording a fully qualified class name along with its computed hash to said snapshot file; for each deployment descriptor, computing a unique hash;
   recording the deployment descriptor name along with its computed hash to said snapshot file; and,
   associating the snapshot file with the EJB class.

15. The computer readable medium of claim 14 wherein said for each dependent EJB class computing a unique hash is based on the public method signatures and public field declarations for the class.

16. The computer readable medium of claim 14 wherein said for each deployment descriptor computing a unique hash is based on the bytes of the deployment descriptor file.

17. The computer readable medium of claim 14 wherein said associating the snapshot file with the EJB class includes storing the snapshot file in the ejb-jar file.

18. The computer readable medium of claim 13, wherein the deployment related version information includes one or more deployment descriptor components that are represented as a plurality of hash values, and wherein upon deployment, the deployment descriptor component's hash value are compared between those in the first snapshot and those in the second snapshot, and if either one or both of the hash values has changed, indicating a change in either one or both of the dependent EJB classes and the deployment descriptor, then the EJB compiler is automatically invoked.

19. A method for determining when an EJB compiler needs to be executed when deploying EJBs to a new version of a server, comprising the steps of:
   compiling, at a first server instance having a first server version, a plurality of EJB classes and storing the compiled EJB classes in an ejb-jar file;
   generating, for each EJB class in the ejb-jar file, a first snapshot of deployment related version information for that EJB class that is associated with the first server version, dependent EJB classes, and deployment descriptor, at the time that particular EJB class was compiled;
   associating the snapshot with the EJB class, and storing the plurality of snapshots in the ejb-jar file;
   deploying, to a second server instance having a second server version, a new version of art the EJB class contained within the ejb-jar file;
   generating, for each EJB class in the ejb-jar file, after it has been deployed, a second snapshot of deployment related version information for that EJB class that is associated with the second server version, dependent EJB classes, and deployment descriptor; and
   automatically comparing the first and second snapshots to determine whether the EJB compiler needs to be invoked on the EJB class for the second version of the server at the second server instance, and if so automatically generating and compiling wrapper classes for the second version of the server, and storing them within the ejb-jar file.

20. The method of claim 19, wherein the deployment related version information includes one or more deployment descriptor components that are represented as a plurality of hash values, and wherein upon deployment, the deployment descriptor component's hash value are compared between those in the first snapshot and those in the second snapshot, and if either one or both of the hash values has changed, indicating a change in the server version, then the EJB compiler is automatically invoked.

* * * * *

UNITED STATES PATENT AND TRADEMARK OFFICE
CERTIFICATE OF CORRECTION

PATENT NO. : 7,290,250 B2
APPLICATION NO. : 10/785846
DATED : October 30, 2007
INVENTOR(S) : Shinn et al.

It is certified that error appears in the above-identified patent and that said Letters Patent is hereby corrected as shown below:

In column 4, line 61, in claim 7, after "class" insert -- , --.

Signed and Sealed this

Ninth Day of March, 2010

David J. Kappos
*Director of the United States Patent and Trademark Office*